(12) United States Patent
Roshan Fekr et al.

(10) Patent No.: US 12,331,658 B2
(45) Date of Patent: Jun. 17, 2025

(54) TEST BLADE FOR GAS TURBINE ENGINE AND METHOD OF MAKING

(71) Applicant: Pratt & Whitney Canada Corp., Québec (CA)

(72) Inventors: Masoud Roshan Fekr, St-Lambert (CA); Rana Foroutan, St-Lambert (CA)

(73) Assignee: PRATT & WHITNEY CANADA CORP., Québec (CA)

( * ) Notice: Subject to any disclaimer, the term of this patent is extended or adjusted under 35 U.S.C. 154(b) by 0 days.

(21) Appl. No.: 18/118,337

(22) Filed: Mar. 7, 2023

(65) Prior Publication Data

US 2024/0301800 A1   Sep. 12, 2024

(51) Int. Cl.
*F01D 5/30* (2006.01)
*F01D 5/14* (2006.01)
(Continued)

(52) U.S. Cl.
CPC .............. *F01D 5/30* (2013.01); *F01D 5/14* (2013.01); *F05D 2230/60* (2013.01)

(58) Field of Classification Search
CPC ...... F01D 5/3007; F01D 5/282; F01D 21/045; F01D 5/323; F01D 5/326; F01D 5/30; F01D 5/3053; F01D 21/003; F01D 5/14; F01D 5/147; F01D 25/06; F01D 25/243; F01D 5/18; F01D 5/22; F01D 5/3038; F01D 5/3069; F01D 5/32; F01D 9/042; F04D 29/322; F04D 29/324; F04D 27/001; F04D 29/34; F04D 29/38; F04D 29/388; F05D 2220/36; F05D 2230/70; F05D 2300/603;
(Continued)

(56) References Cited

U.S. PATENT DOCUMENTS 3,694,104 A * 9/1972 Erwin .................. F01D 5/3053
416/241 R
3,720,481 A * 3/1973 Motta ...................... F01D 5/28
416/207
(Continued)

FOREIGN PATENT DOCUMENTS

CN    114964784 A    8/2022
DE    102022200592 A1    7/2023
(Continued)

OTHER PUBLICATIONS

Extended European Search Report for EP Application 24162115.0; Mailing Date, Jul. 4, 2024.
(Continued)

*Primary Examiner* — Eric J Zamora Alvarez
(74) *Attorney, Agent, or Firm* — CANTOR COLBURN LLP

(57) ABSTRACT

A test blade for a blade release test, including: an airfoil extending radially from a platform; and a root portion secured to the platform, the root portion having a first inner opening extending longitudinally from a leading edge of the root portion towards a trailing edge of the root portion, wherein the first inner opening extends from and is located within two second inner openings, one of which extends from the leading edge of the root portion and the other extends from the trailing edge of the root portion.

20 Claims, 6 Drawing Sheets

(51) Int. Cl.
  *F01D 21/00* (2006.01)
  *F01D 21/04* (2006.01)
  *F01D 25/28* (2006.01)
  *G01M 5/00* (2006.01)
  *G01M 15/14* (2006.01)

(58) Field of Classification Search
  CPC ........... F05D 2240/30; F05D 2250/291; F05D 2250/294; F05D 2220/30; F05D 2220/32; F05D 2230/60; F05D 2230/64; F05D 2260/36; F05D 2260/37; F05D 2260/83; F05D 2260/941
  See application file for complete search history.

(56) References Cited

U.S. PATENT DOCUMENTS

| | | | |
|---|---|---|---|
| 4,004,860 A | 1/1977 | Gee | |
| 4,343,593 A | 8/1982 | Harris | |
| 4,778,342 A * | 10/1988 | Conlow | F01D 5/323 416/193 A |
| 5,310,312 A * | 5/1994 | Balfour | F01D 5/3007 416/61 |
| 5,314,307 A * | 5/1994 | Farmer | F01D 5/3007 416/61 |
| 5,984,639 A * | 11/1999 | Gekht | F01D 5/323 411/399 |
| 6,065,938 A | 5/2000 | Bartsch | |
| 6,183,202 B1 | 2/2001 | Ganshaw | |
| 6,250,166 B1 | 6/2001 | Dingwell et al. | |
| 7,121,803 B2 | 10/2006 | Gautreau et al. | |
| 7,513,747 B2 | 4/2009 | Bachofner et al. | |
| 8,864,465 B2 | 10/2014 | Viegas et al. | |
| 9,188,011 B2 | 11/2015 | Khanin | |
| 9,835,047 B2 * | 12/2017 | Whitehead | F01D 5/3007 |
| 10,113,442 B2 | 10/2018 | Hall et al. | |
| 10,260,512 B2 * | 4/2019 | Hall | F01D 5/34 |
| 11,821,335 B2 | 11/2023 | Sidebotham et al. | |
| 2004/0213672 A1 | 10/2004 | Gautreau et al. | |
| 2009/0297351 A1 | 12/2009 | Brahmasuraih | |
| 2020/0277866 A1 | 9/2020 | Dos Santos et al. | |

FOREIGN PATENT DOCUMENTS

| | | |
|---|---|---|
| EP | 2546465 A1 | 1/2013 |
| FR | 3042536 B1 | 4/2017 |

OTHER PUBLICATIONS

US Notice of Allowance corresponding to U.S. Appl. No. 18/127,349; Mailing Date, Jul. 1, 2024.
European Search Report for EP Application No. 24167327.6; Mailing Date, Jul. 11, 2024.
He Z et al., "A Blade Release Method for FBO Test", Experimental Techniques, vol. 42, No. 3, Feb. 16, 2018, 9 pages.
U.S. Non-Final Office Action corresponding to U.S. Appl. No. 18/903,546; Issue date, Mar. 5, 2025, 35 pages.

* cited by examiner

TEST BLADE FOR GAS TURBINE ENGINE AND METHOD OF MAKING

BACKGROUND

This present disclosure relates to a test blade for a blade release test.

Gas turbine engines typically include a fan section, a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Both the compressor and turbine sections may include alternating series of rotating blades and stationary vanes that extend into the core flow path of the gas turbine engine. For example, in the turbine section, turbine blades rotate and extract energy from the hot combustion gases that are communicated along the core flow path of the gas turbine engine. The turbine vanes, which generally do not rotate, guide the airflow and prepare it for the next set of blades. In addition, the fan section also includes rotating fan blades.

The fan blades, turbine blades and compressor blades, all rotate at high speed. In the unlikely event where a portion of or one of these blades becomes detached from the hub on which it is mounted while rotating may result in the blade impacting another blade and the surrounding engine casing at high speed. As such, tests are carried out to evaluate the damage which may be caused by the release of a blade during operation, in order to allow for appropriate design measures to be taken. As such, it is desirable to have a test blade designed in order to perform a predictable separation of the blade during a blade-off test.

BRIEF DESCRIPTION

Disclosed is a test blade for a blade release test, including: an airfoil extending radially from a platform; and a root portion secured to the platform, the root portion having a first inner opening extending longitudinally from a leading edge of the root portion towards a trailing edge of the root portion, wherein the first inner opening extends from and is located within two second inner openings, one of which extends from the leading edge of the root portion and the other extends from the trailing edge of the root portion.

In addition to one or more of the features described above, or as an alternative to any of the foregoing embodiments, a cylinder of root material is provided about the first inner opening, the cylinder of root material extends from an outer periphery of the first inner opening to an outer periphery of the two second inner openings.

In addition to one or more of the features described above, or as an alternative to any of the foregoing embodiments, the first inner opening and the two second inner openings have a circular shape and a diameter of the first inner opening is less than a diameter of the two second inner openings.

In addition to one or more of the features described above, or as an alternative to any of the foregoing embodiments, the first inner opening and the two second inner openings are located below the platform and above laterally extending portions of the root portion.

In addition to one or more of the features described above, or as an alternative to any of the foregoing embodiments, the laterally extending portions extend from the leading edge of the root portion to the trailing edge of the root portion.

In addition to one or more of the features described above, or as an alternative to any of the foregoing embodiments, the first inner opening and the two second inner openings are located below the platform and in a middle of a neck portion of the root portion.

In addition to one or more of the features described above, or as an alternative to any of the foregoing embodiments, the first inner opening and the two second inner openings are located in a middle of a neck portion of the root portion.

In addition to one or more of the features described above, or as an alternative to any of the foregoing embodiments, an elongated slot is located on both the leading edge of the root portion and the trailing edge of the root portion.

In addition to one or more of the features described above, or as an alternative to any of the foregoing embodiments, an elongated slot is located either on the leading edge of the root portion or the trailing edge of the root portion.

In addition to one or more of the features described above, or as an alternative to any of the foregoing embodiments, the elongated slot extends transverse to the first inner opening and the two second inner openings.

In addition to one or more of the features described above, or as an alternative to any of the foregoing embodiments, the elongated slot extends through the two second inner openings.

In addition to one or more of the features described above, or as an alternative to any of the foregoing embodiments, the elongated slot is centered about a center of the first inner opening and the two second inner openings.

In addition to one or more of the features described above, or as an alternative to any of the foregoing embodiments, the elongated slot extends transverse to the first inner opening and the two second inner openings.

In addition to one or more of the features described above, or as an alternative to any of the foregoing embodiments, the elongated slot extends through the two second inner openings.

In addition to one or more of the features described above, or as an alternative to any of the foregoing embodiments, the elongated slot is centered about a center of the first inner opening and the two second inner openings.

In addition to one or more of the features described above, or as an alternative to any of the foregoing embodiments, the test blade is a turbine blade.

In addition to one or more of the features described above, or as an alternative to any of the foregoing embodiments, the root portion has a fir tree configuration.

In addition to one or more of the features described above, or as an alternative to any of the foregoing embodiments, the elongated slot and the first inner opening and the two second inner openings are formed with electrical discharge machining.

In addition to one or more of the features described above, or as an alternative to any of the foregoing embodiments, an elongated slot is located on both the leading edge of the root portion and the trailing edge of the root portion.

Also disclosed is a method for forming a test blade for a blade release test, including: forming the test blade with an airfoil extending radially from a platform of the test blade; and securing a root portion to the platform, the root portion having a first inner opening formed therein and extending longitudinally from a leading edge of the root portion towards a trailing edge of the root portion, wherein the first inner opening extends from and is located within two second inner openings formed in the root portion, one of which extends from the leading edge of the root portion and the other which extends from the trailing edge of the root portion.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the FIGS.

Figure 1:
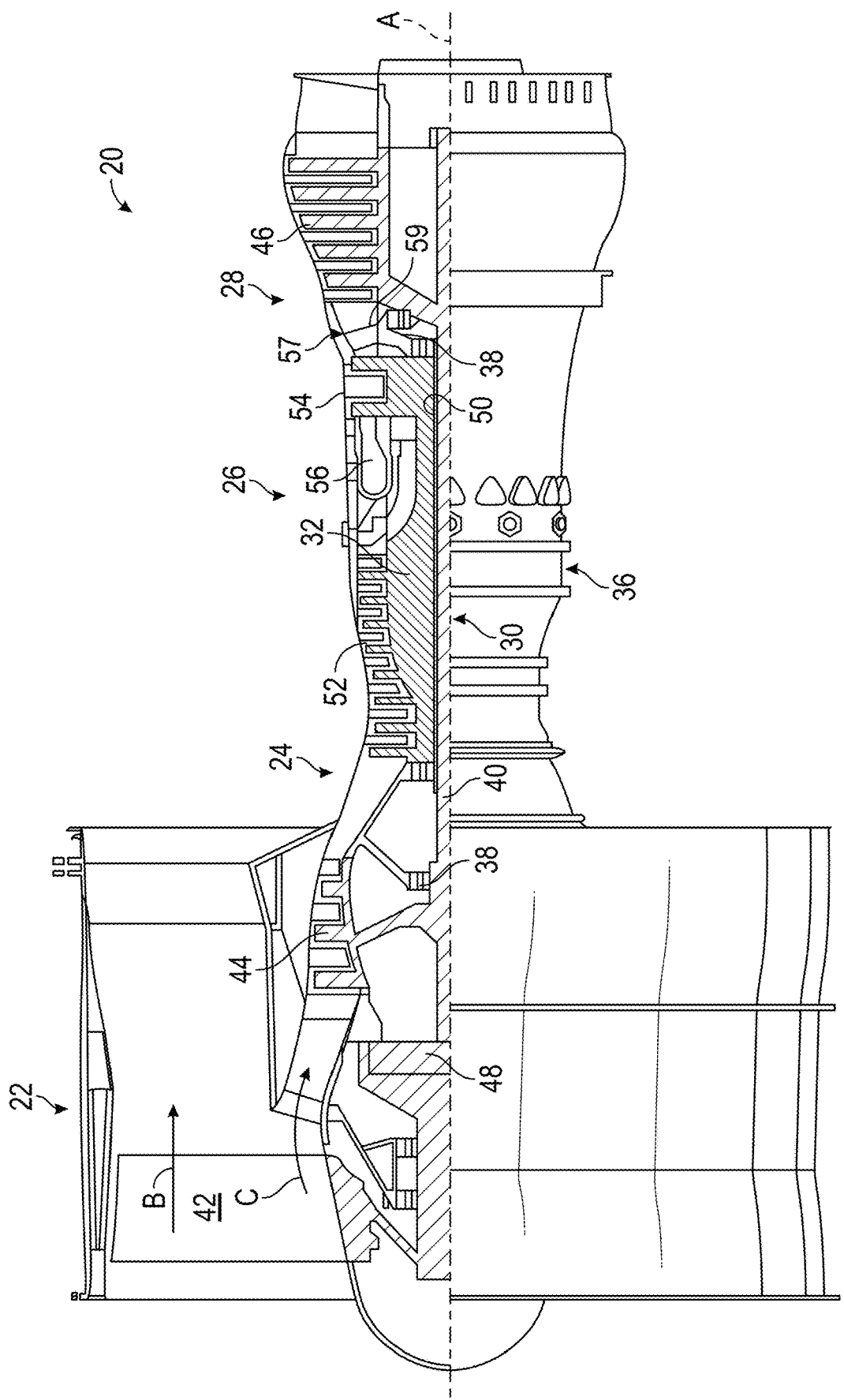
FIG. 1 is a schematic, partial cross-sectional view of a gas turbine engine in accordance with this disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first or low pressure compressor 44 and a first or low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second or high pressure compressor 52 and a second or high pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 illustrated in FIG. 1 is merely exemplary and the present disclosure is contemplated for use with any type of gas turbine engine that has blades secured to a rotating hub.

Figure 2:
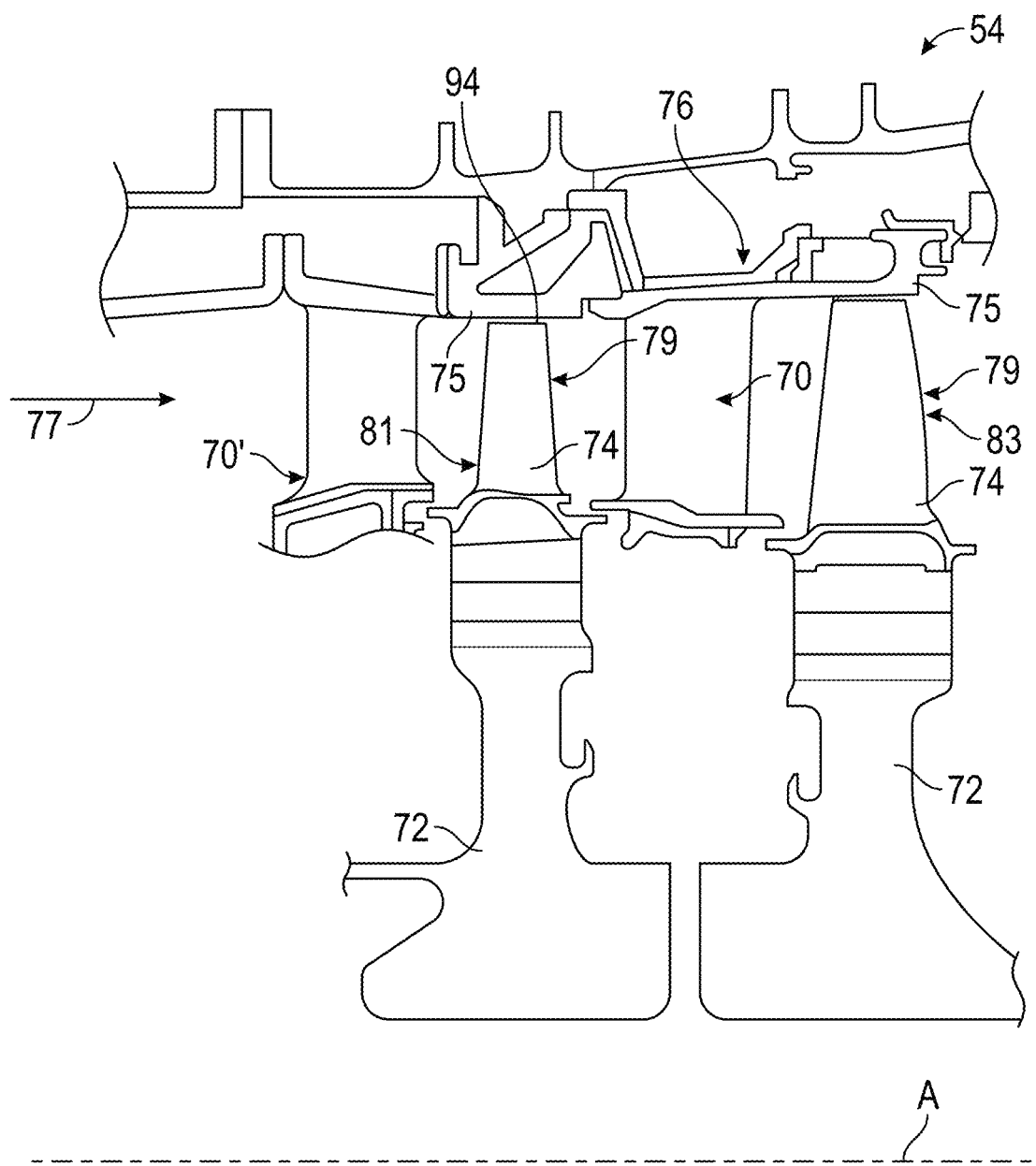
FIG. 2 is a schematic view of a two-stage high pressure turbine of the gas turbine engine.

FIG. 2 illustrates a portion of the high pressure turbine (HPT) 54. FIG. 2 also illustrates a high pressure turbine stage vanes 70 one of which (e.g., a first stage vane 70') is located forward of a first one of a pair of turbine disks 72 each having a plurality of turbine blades 74 secured thereto. The turbine blades 74 rotate proximate to blade outer air seals (BOAS) 75 which are located aft of the vane 70 or first stage vane 70'. The other vane 70 is located between the pair of turbine disks 72. This vane 70 may be referred to as the second stage vane. As used herein the first stage vane 70' is the first vane of the high pressure turbine section 54 that is located aft of the combustor section 26 and the second stage vane 70 is located aft of the first stage vane 70' and is located between the pair of turbine disks 72. In addition, blade outer air seals (BOAS) 75 are disposed between the first stage vane 70' and the second stage vane 70. The high pressure turbine stage vane 70 (e.g., second stage vane) or first stage vane 70' is one of a plurality of vanes 70 that are positioned circumferentially about the axis A of the engine in order to provide a stator assembly 76. Hot gases from the combustor section 26 flow through the turbine in the direction of arrow 77. Although a two-stage high pressure turbine is illustrated other high pressure turbines are considered to be within the scope of various embodiments of the present disclosure.

Figure 3:
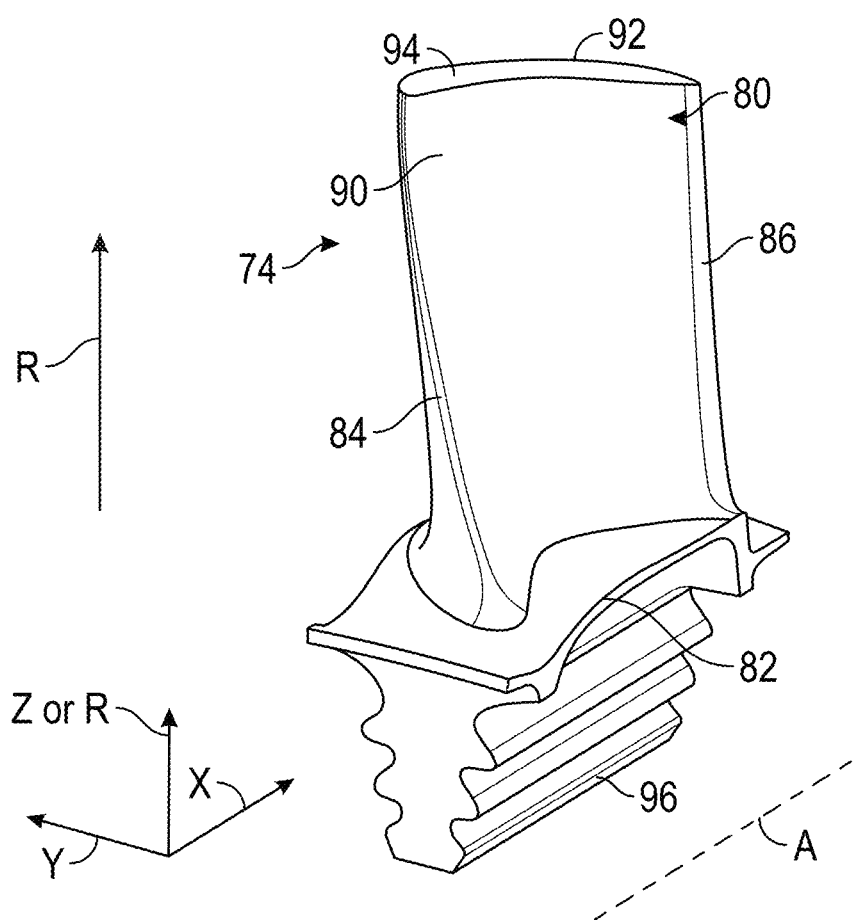
FIG. 3 is perspective view of a turbine blade.

Referring now to at least FIGS. 1-3, a turbine blade 74 is illustrated. As mentioned above, turbine blades 74 are secured to a turbine disk 72 that is configured to rotate about axis A. The turbine disk 72 and its turbine blades 74 may be referred to as a turbine rotor assembly 79. The turbine blades 74 and their associated disks 72 are located behind or downstream from either the first stage vane 70' or the second stage vane 70. The turbine blades located behind the first stage vane 70' and in front of the second stage vane 70 may be referred to first stage turbine blades 81 and the turbine blades 74 located behind the second stage vane 70 may be referred to second stage turbine blades 83. The turbine disk 72 and its turbine blades 74 may be referred to as a turbine rotor assembly 79, which depending on its location (e.g., located behind or downstream from either the first stage vane 70' or the second stage vane 70) the turbine rotor assembly may be referred to as a first stage turbine rotor assembly (behind or downstream from the first stage vanes 70' and before or upstream from the second stage vanes 70)

or as a second stage turbine rotor assembly (behind or downstream from the second stage vanes 70 and behind or downstream, from the first stage turbine rotor assembly) of a high pressure turbine of the gas turbine engine.

Each turbine blade 74 has an airfoil 80 that extends radially from a platform 82. When the turbine blade 74 is secured to the turbine disk 72 and the disk 72 is secured to the engine 20, the airfoil 80 is further away from axis A than the platform 82. In other words, the airfoil 80 extends radially away from the platform 82 such that the airfoil 80 is at a further radial distance from the axis A than the platform 82. The surface of the platform 82 may be contoured to minimize aerodynamic losses.

The airfoil 80 has a leading edge 84 and a trailing edge 86. The airfoil 80 has a pressure side 90 and a suction side 92 each of which extends between the leading edge 84 and the trailing edge 86. The airfoil also terminates at a tip 94 that is furthest radially from the platform 82. Also shown in at least FIG. 3, is a root, root tree or root portion 96. Root, root tree or root portion 96 is used to secure the turbine blade 74 to the turbine disk 72. In one non-limiting embodiment, the root portion has a fir tree configuration. In one embodiment, the airfoil 80 may be integrally formed or cast with the platform 82 and/or the root portion 96. In other words, the turbine blade 74 including the airfoil 80, the platform 82 and the root 96 may be cast as a single part.

The geometry the blade 74 may be defined along X, Y and Z axes, which respectively correspond to the axial (X), circumferential (Y) and radial (Z or R) directions shown in at least FIG. 3

Figure 4:
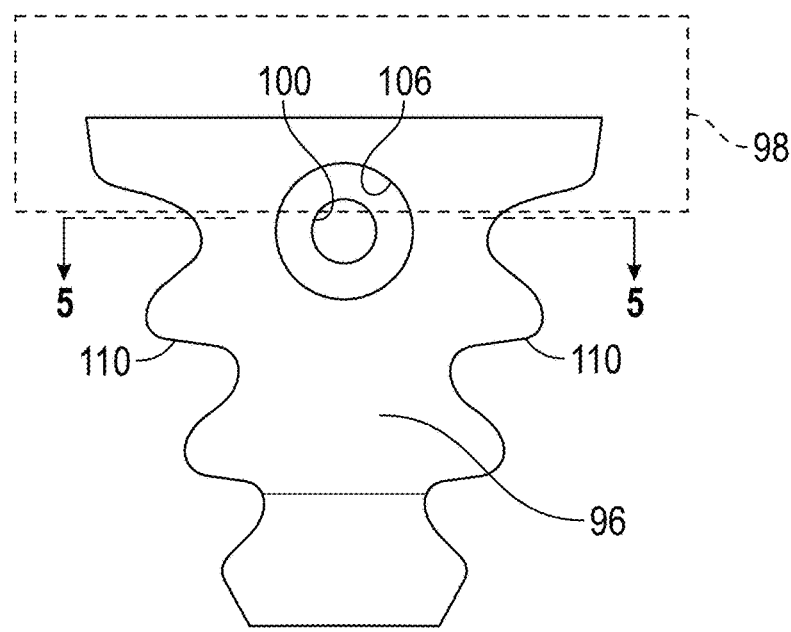
FIG. 4 is an end view of a root of a test blade in accordance with the present disclosure.
Figure 5:
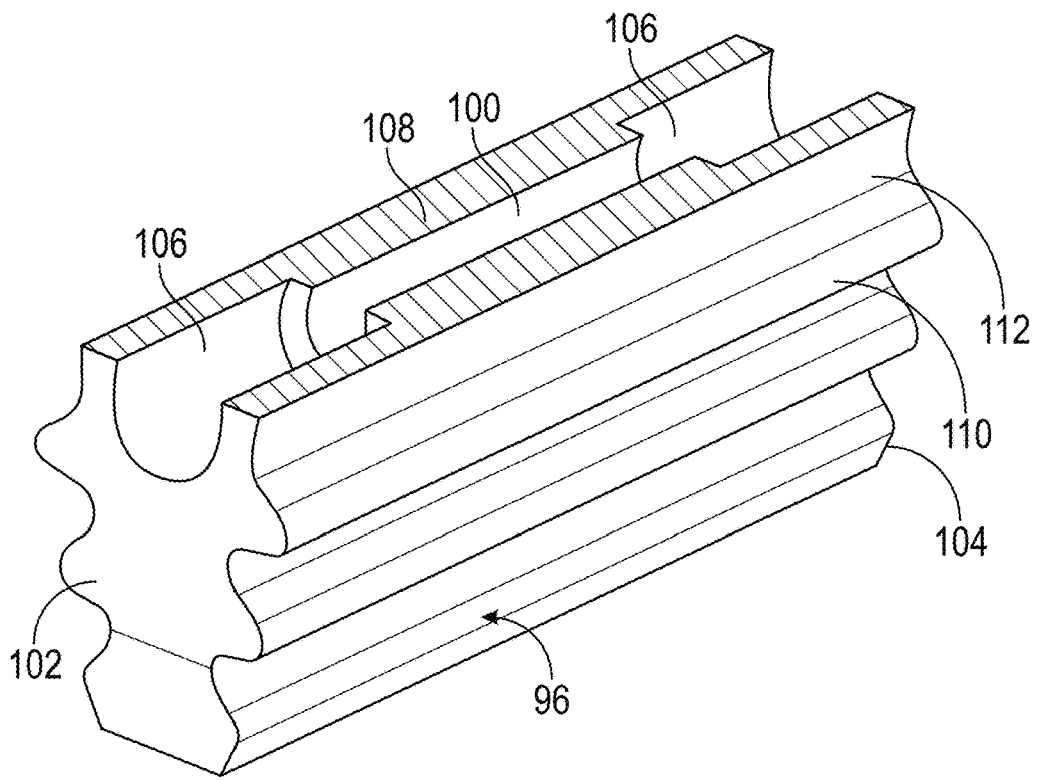
FIG. 5 is a view along lines 5-5 of FIG. 4.
Figure 6:
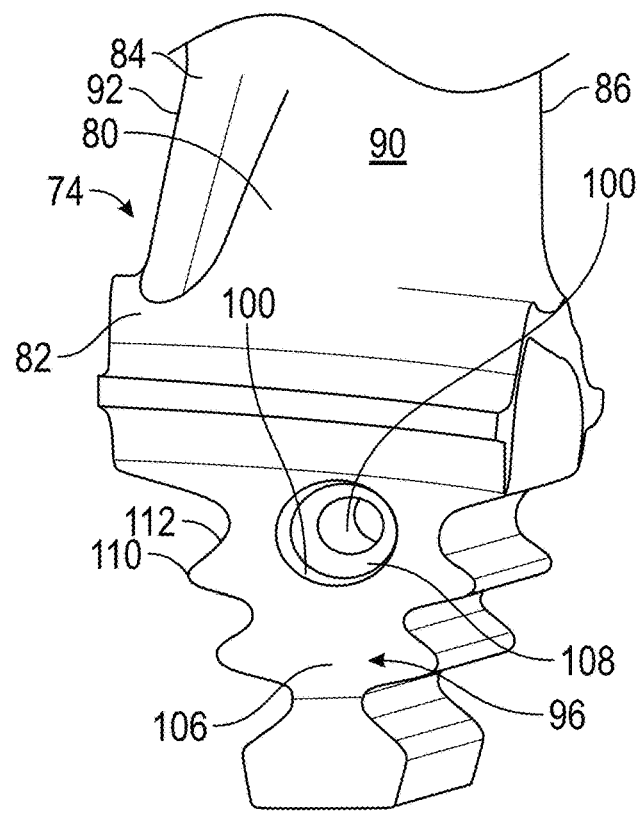
FIG. 6 is a perspective end view of a root of a test blade in accordance with the present disclosure.

Referring now to FIGS. 4-6 portions of a test blade 74 in accordance with present disclosure is illustrated. Test blade 74 is similar to the configuration illustrated in FIG. 3 however openings are formed in the root portion 96 such that when the test blade 74 is rotated at certain speeds when secured to a test wheel or turbine disk 72 in a test engine, the blade-off segment, which comprises the airfoil 80, the platform 82 and a top of the root portion 96 of the test blade 74, will separate from the root portion 96 such that test data pertaining to the blade-off segment separation event may be achieved. The top of the root portion 96 is located within section 98 as shown in FIG. 4. In other words, the top of the root portion 96 is the portion of the root portion 96 radially above where the test blade separates from radially lower portions of the root portion 96. Use of the test blade 74 can be in either a separate hub similar to turbine disk 72 that is rotated until the desired separation occurs and/or a test engine wherein rotation of the turbine disk 72 at a certain speed causes the blade-off segment to separate. When used in a test engine the separation of the blade-off segment will cause certain conditions to occur which can be monitored in order to design engines to operate in the unlikely event where a blade-off occurs. It being understood that while a turbine blade 74 is illustrated, various embodiments of the present disclosure may also pertain to compressor or fan blades.

As illustrated, the root portion 96 of the test blade 74 has a first inner opening 100 extending longitudinally from a leading edge 102 of the root portion 96 towards a trailing edge 104 of the root portion 96. The first inner opening 100 extends from and is located within second inner openings 106 that extend from both the leading edge 102 of the root portion 96 and the trailing edge 104 of the root portion. In other words, two second inner openings 106 are provided, one extending from the leading edge 102 of the root portion 96 to the first inner opening 100 and the other extending from the trailing edge 104 of the root portion 96 to the first inner opening 100. As such, a cylinder 108 of root material is provided about the first inner opening 100. The cylinder 108 of root material extends from the outer periphery of the first inner opening 100 to the outer periphery of the two second inner openings 106.

In one embodiment, the first inner opening 100 and the two second inner openings 106 may have a circular shape wherein the diameter of the first inner opening 100 is less than that of the diameter of the two second inner openings 106. Of course, other configurations such as ellipses, ovals, etc., may be used for the first inner opening 100 and the two second inner openings 106 as long as the diameter or periphery of the first inner opening 100 is less that the diameter or periphery of the two second inner openings 106.

By employing this configuration, testing of the test blade 74 may be performed and the length of the cylinder 108 of root material or the length of the first inner opening 100 from the leading edge 102 to the trailing edge 104 of the root portion 96 may be varied after testing to provide different or desired separation of the blade-off segment from the root portion 96 during subsequent tests. For example, the length of the cylinder 108 correlates to the speeds required to have the blade-off segment separate from the root portion 96. In other words, by employing the nested openings disclosed herein variations in the length of the cylinder 108 of root material can be used to tune the blade-off segment of the blade 74 to separate at desired conditions for blade-off testing or blade release testing.

By employing this configuration, testing of the test blade 74 may be performed and the inner opening 100 of the root portion 96 can be reamed after testing, either from the leading edge 102 and/or from the trailing edge 104, to provide desired rotational speed for separation of the blade-off segment from the root portion 96 for subsequent tests. For example, the diameter of the inner opening 100 correlates to the speeds required to have the blade-off segment separate from the root portion 96 for blade-off testing or blade release testing.

As illustrated, the center of the first inner opening 100 and the second openings 106 are located below the platform 82 and above the highest laterally extending portions 110 of the root portion 96 or in other words, the first inner opening 100 and the second openings 106 are located in the uppermost neck portion 112 of the root portion 96. In one embodiment, the first inner opening 100 and the second openings 106 are located in the middle of the uppermost neck portion 112. The laterally extending portions 110 extending from the leading edge 102 of the root portion 96 to the trailing edge 104 of the root portion 96.

Figure 7:
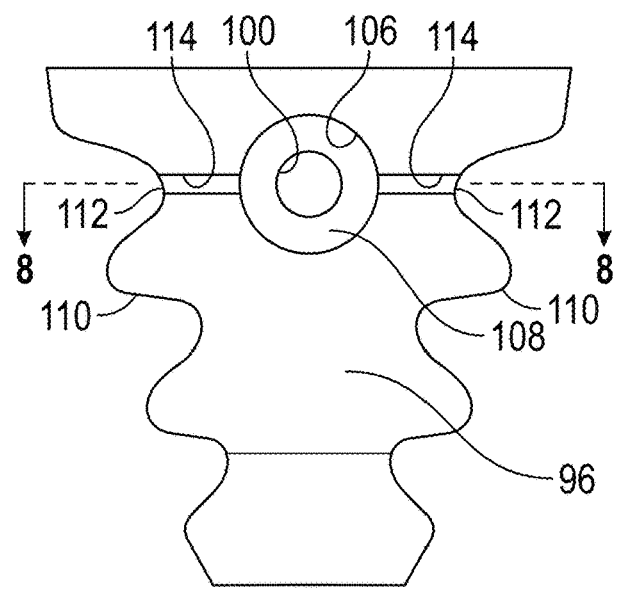
FIG. 7 is an end view of a root of a test blade in accordance with the present disclosure.
Figure 8:
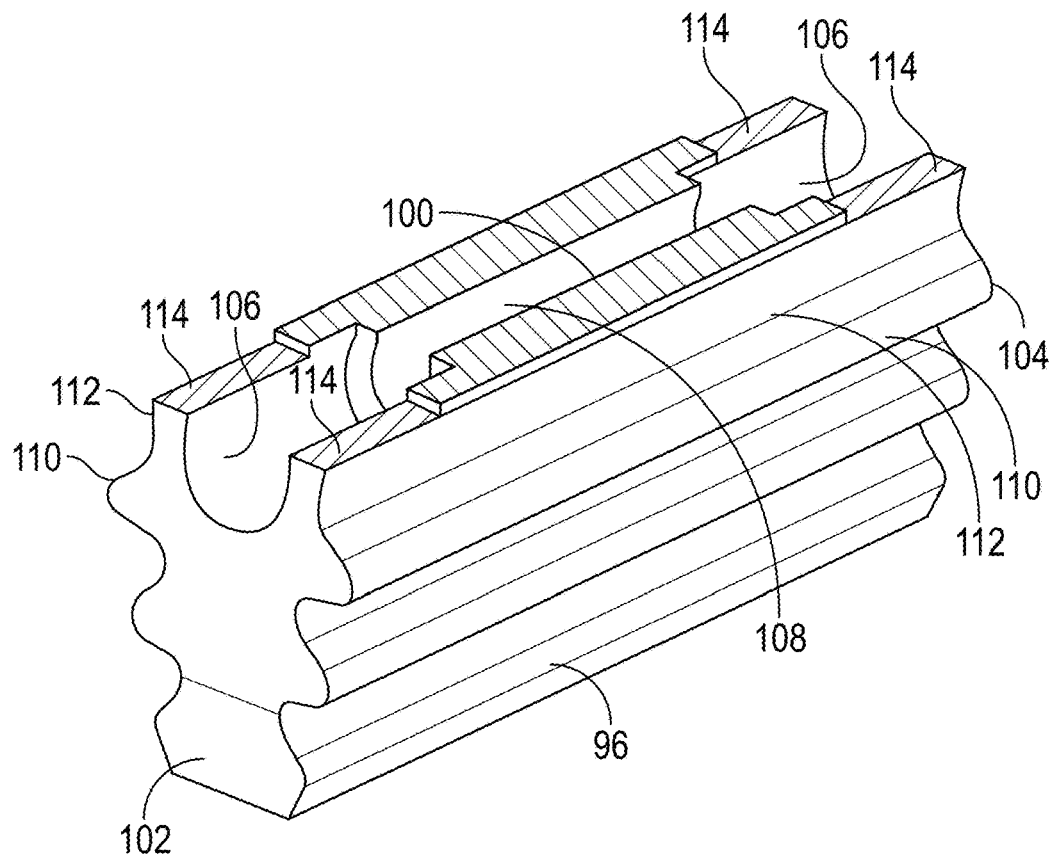
FIG. 8 is a view along lines 8-8 of FIG. 7.
Figure 9:
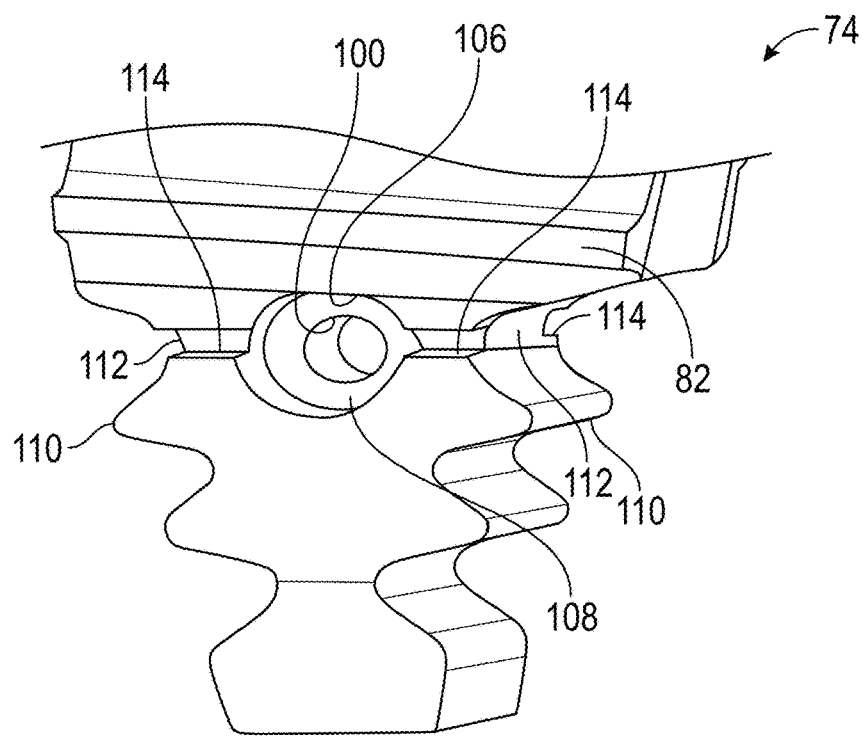
FIG. 9 is a perspective end view of a root of a test blade in accordance with the present disclosure.

Referring now to FIGS. 7-9, an alternative embodiment of the present disclosure is illustrated. Here an elongated slot 114 is located on either or both the leading edge 102 of the root portion 96 and the trailing edge 104 of the root portion 96. The slots 114 extending transverse to the first inner opening 100 and the second openings 106 or along a path from the pressure side and suction side of the airfoil 80. As illustrated, the slots 114 extend through at least the second openings 106 and in one non-limiting embodiment, the slots 114 may extend through or have their width centered about the center of the first inner opening 100 and the second openings 106. While the slots 114 are shown on both the leading edge 102 of the root portion 96 and the trailing edge 104 of the root portion 96 it is contemplated that in some embodiments, the slots 114 may only be located on the leading edge 102 of the root portion 96 or only on the trailing edge 104 of the root portion 96 or as mentioned above the slots 114 may be located on both the leading edge 102 and the trailing edge 104 of the root portion 96.

Accordingly, various embodiments of the present disclosure contemplate a blade 74 for use in blade off testing or blade release testing where the root portion can be configured with openings 100, 106 and/or slots 114 where separation of the blade-off segment from the root portion 96 can be achieved at certain testing conditions.

In one non-limiting embodiment, the openings 100, 106 and slots 114 may be formed in the root portion 96 via electrical discharge machining (EMD).

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A test blade for a blade release test, comprising:
    an airfoil extending radially from a platform; and
    a root portion secured to the platform, the root portion having a first inner opening extending longitudinally from a leading edge of the root portion towards a trailing edge of the root portion, the first inner opening extending from and is located within two second inner openings, one of which extends from the leading edge of the root portion and the other extends from the trailing edge of the root portion, wherein a blade-off segment comprising the airfoil, the platform and a top portion of the root portion is configured to separate from other portions of the root portion when the test blade is rotated at a predetermined speed during the blade release test.

2. The test blade as in claim 1, wherein a cylinder of root material is provided about the first inner opening, the cylinder of root material extends from an outer periphery of the first inner opening to an outer periphery of the two second inner openings.

3. The test blade as in claim 2, wherein the first inner opening and the two second inner openings have a circular shape and a diameter of the first inner opening is less than a diameter of the two second inner openings.

4. The test blade as in claim 1, wherein the first inner opening and the two second inner openings have a circular shape and a diameter of the first inner opening is less than a diameter of the two second inner openings.

5. The test blade as in claim 1, wherein the first inner opening and the two second inner openings are located below the platform and above laterally extending portions of the root portion.

6. The test blade as in claim 5, wherein the laterally extending portions extend from the leading edge of the root portion to the trailing edge of the root portion.

7. The test blade as in claim 6, wherein the first inner opening and the two second inner openings are located below the platform and in a middle of a neck portion of the root portion.

8. The test blade as in claim 1, wherein the first inner opening and the two second inner openings are located in a middle of a neck portion of the root portion.

9. The test blade as in claim 1, further comprising:
    an elongated slot located on either the leading edge of the root portion or the trailing edge of the root portion.

10. The test blade as in claim 9, wherein the elongated slot extends transverse to the first inner opening and the two second inner openings.

11. The test blade as in claim 9, wherein the elongated slot extends through the two second inner openings.

12. The test blade as in claim 9, wherein the elongated slot is centered about a center of the first inner opening and the two second inner openings.

13. The test blade as in claim 9, wherein the elongated slot and the first inner opening and the two second inner openings are formed with electrical discharge machining.

14. The test blade as in claim 1, further comprising:
    an elongated slot located on both the leading edge of the root portion and the trailing edge of the root portion.

15. The test blade as in claim 14, wherein the elongated slot extends transverse to the first inner opening and the two second inner openings.

16. The test blade as in claim 14, wherein the elongated slot extends through the two second inner openings.

17. The test blade as in claim 14, wherein the elongated slot is centered about a center of the first inner opening and the two second inner openings.

18. The test blade as in claim 1, wherein the test blade is a turbine blade.

19. The test blade as in claim 1, wherein the root portion has a fir tree configuration.

20. A method for forming the test blade for the blade release test of claim 1, comprising:
    forming the test blade with the airfoil extending radially from the platform of the test blade; and
    securing the root portion to the platform, the root portion having the first inner opening formed therein and extending longitudinally from the leading edge of the root portion towards the trailing edge of the root portion, wherein the first inner opening extends from and is located within the two second inner openings formed in the root portion, one of which extends from the leading edge of the root portion and the other which extends from the trailing edge of the root portion.

* * * * *